United States Patent [19]
Patrick

[11] Patent Number: 5,198,980
[45] Date of Patent: Mar. 30, 1993

[54] PORTABLE TESTING APPARATUS FOR AIRPLANE ENGINES

[76] Inventor: James D. Patrick, 23079 Forest La., Taylor, Mich. 48180

[21] Appl. No.: 609,474

[22] Filed: Nov. 5, 1990

[51] Int. Cl.$^5$ .......................................... G01M 15/00
[52] U.S. Cl. .............................. 364/424.03; 364/550; 73/116
[58] Field of Search ...................... 364/424.03, 424.04, 364/424.06, 431.03, 431.02, 551.01, 557, 558; 73/116, 117.2

[56] References Cited

U.S. PATENT DOCUMENTS

| | | | |
|---|---|---|---|
| 4,135,246 | 1/1979 | McMannis | 364/551 |
| 4,215,412 | 7/1980 | Bernier et al. | 364/431.02 |
| 4,575,803 | 3/1986 | Moore | 364/431.02 |
| 4,602,127 | 7/1986 | Neely et al. | 364/431.03 |
| 4,656,585 | 4/1987 | Stephenson | 364/424.06 |
| 4,787,053 | 11/1988 | Moore | 364/551.01 |
| 5,001,638 | 3/1991 | Zimmerman et al. | 364/424.06 |

Primary Examiner—Thomas G. Black
Attorney, Agent, or Firm—Brooks & Kushman

[57] ABSTRACT

A self-powered and self-contained portable testing apparatus for monitoring critical operating parameters of an aircraft reciprocating engine. The portable testing apparatus is typically used for the running-in of aircraft engines after overhaul, before returning the engines to service. The portable testing apparatus includes a plurality of sensors for sensing and generating analog signals corresponding to temperature at various locations inside and outside the engine. A multiposition selector switch electrically connects to each of the sensors. The switch is designed to select one of the analog temperature signals and to transmit the selected signal to a computer having a display. The computer converts the selected signal into a digital temperature signal and indicates the digital signal in corresponding numerical representation on its display. Also included is a tachometer for measuring and displaying the operating speed of the engine. The tachometer has a memory, and can calculate and store in its memory the average operating speed of the engine and the maximum operating speed achieved during the run-in of the engine. A manifold pressure gauge senses and displays intake manifold pressure and an oil pressure gauge senses and displays engine oil pressure. A run time monitor electrically connects to an oil pressure switch which, in turn, connects to the oil pressure circuit. The oil pressure switch closes when the engine is turned on and develops oil pressure. The monitor is supplied with electrical power upon oil pressure switch closure and commences to monitor engine run time.

16 Claims, 3 Drawing Sheets

PORTABLE TESTING APPARATUS FOR AIRPLANE ENGINES

TECHNICAL FIELD

This invention relates to a portable testing apparatus for monitoring the operating parameters of an aircraft reciprocating engine.

BACKGROUND OF THE INVENTION

Federal Aviation Administration regulations require that an aircraft reciprocating engine shall not be returned to service after an annual or 100 hour inspection or overhaul unless the engine has first been tested in order to determine that certain operating characteristics fall within acceptable tolerances. Such characteristics include power output, magneto operation, fuel and oil pressure, and cylinder head and oil temperatures. Each must satisfy the manufacturer's recommendations before the engine can be returned to service and before the aircraft can be put back on the flight line. By way of illustration, Continental Aircraft Service Bulletin M81-5 requires that after major overhaul or cylinder replacement, each cylinder must be equipped with a temperature sensing device to monitor the head temperature. Likewise, Avco Lycoming Service Instruction 1427A states that engine revolutions per minute (RPM), oil temperature, cylinder head temperature, oil pressure and intake manifold pressure should be measured during ground run-in of a reciprocating aircraft engine following overhaul or replacement of a cylinder with new piston rings.

Current running-in procedures for an aircraft reciprocating engine are important, as they ensure the quality of engine repairs ranging from major overhaul to the replacement of a cylinder with new piston rings before returning the aircraft to the flight line. By monitoring certain operating parameters during engine run-in, various anomalies such as low oil pressure, high intake manifold vacuum, high oil and cylinder head temperatures, and improperly operating magnetos can be detected first on the ground, rather than in the air. Abnormal readings may be traced to underlying mechanical problems such as leaky oil filters, broken or inverted piston rings, improperly seated piston rings, clogged oil filters, coolant system leaks and the like before the aircraft is returned to service. Also, abnormal readings may be traced to underlying electrical problems such as faulty oil pump motors, defective spark plugs and other ignition-related problems.

Accordingly, it would be desirable to provide a self-contained, portable testing apparatus capable of monitoring such operating parameters to ensure that the requirements imposed by the FAA and the several aircraft engine manufacturers are fully satisfied.

Heretofore, various test rigs have required removal of the reciprocating engine from the aircraft in order to perform the run-in on a stationary engine test cell facility. This practice has proved very expensive and time consuming. Additionally, it poses the complication of transporting the engine to and from the stationary test cell facility. Predictably, the labor costs associated with transporting the engine from and to the aircraft and those incurred in detaching and reattaching the engine to the airframe after run-in testing are traditionally passed on to the consumer.

To facilitate conformance with required test procedures, several aircraft manufacturers have indicated that the aircraft is a suitable test stand for the running-in of aircraft reciprocating engines. For example, both Continental Service Bulletin M81-5 and Lycoming Service Instruction 1124B provide that run-in testing may be performed with the engine installed in the aircraft. But until now an inexpensive, portable, self-contained, independently powered apparatus has not been available to undertake this task.

In response to this need, the portable testing apparatus herein disclosed is used to monitor critical operating parameters of an aircraft reciprocating engine after the engine has been overhauled or after an annual, or other required inspection before it is returned to service.

A principal object of the invention is to provide a portable testing apparatus in order to simplify the running-in of reciprocating aircraft engines and to reduce the costs incurred in conducting run-in tests. The portable testing apparatus herein disclosed eliminates the transportation problems and the expense associated with running-in an engine at a stationary engine test cell facility by permitting the run-in test to be performed while the engine is attached to the airframe of the aircraft. Alternatively, the invention can be used conveniently to test an engine before mounting within the aircraft without having to transport the engine to a stationary test facility.

SUMMARY OF THE INVENTION

In accordance with the present invention, a self-powered and self-contained portable testing apparatus for monitoring critical operating parameters of an aircraft reciprocating engine is disclosed. The portable testing apparatus is typically used for the running-in of aircraft engines after overhaul, before returning the engines to service. The portable testing apparatus includes a plurality of sensors for sensing and generating analog signals corresponding to temperature at various locations inside and outside the engine. A multiposition selector switch electrically connects to each of the sensors. The switch is designed to select one of the analog temperature signals and to transmit the selected signal to a computer having a display. The computer converts the selected signal into a digital temperature signal and indicates the digital signal in corresponding numerical representation on its display.

In accordance with another feature of the invention, the portable testing apparatus includes a tachometer for measuring and displaying the operating speed of the engine. Among other capabilities, the tachometer has a memory, and can be employed to calculate and store in its memory the average operating speed of the engine and the maximum operating speed achieved during the run-in of the engine.

Another feature of the portable testing apparatus is a manifold pressure gauge for sensing and displaying intake manifold pressure. The manifold gauge connects to and detects the vacuum within the intake manifold circuit.

Yet another feature of the portable testing apparatus is an oil pressure gauge for sensing and displaying engine oil pressure. The oil pressure gauge connects to and detects pressure within the oil pressure circuit.

In accordance with an additional feature of the invention, the portable testing apparatus includes a means for monitoring total engine run time. The run time monitoring means electrically connects to an oil pressure switch which, in turn, connects to the oil pressure circuit. The oil pressure switch closes when the engine is turned on and develops oil pressure. The monitoring means is supplied with electrical power upon oil pressure switch closure and commences to monitor engine run time.

An additional feature of the invention is a rechargeable power supply. The rechargeable power supply includes an adapter plug and a converter for converting alternating current into direct current storable by the rechargeable power supply. The rechargeable power supply provides the portable testing apparatus with a self-contained source of electrical energy. This feature enables the portable testing apparatus to monitor the operating parameters of the engine when the engine is mounted in the aircraft at locations remote from an external A.C. power supply.

In a preferred embodiment of the portable testing apparatus, the electrical wiring for the sensors and the tachometer may be encased in one cable. Similarly, the pressure lines of the manifold pressure gauge and the oil pressure gauge may be encased in another cable. The provision of only two cables running from the portable testing apparatus to the aircraft engine will reduce the likelihood of entangling the electrical wiring and pressure lines, thereby facilitating the use of the portable tester and the run-in of the aircraft engine.

These and other objects, features and advantages of the present invention will become apparent from the following detailed description when taken in conjunction with the accompanying drawings.

BEST MODE FOR CARRYING OUT THE INVENTION

Figure 1:
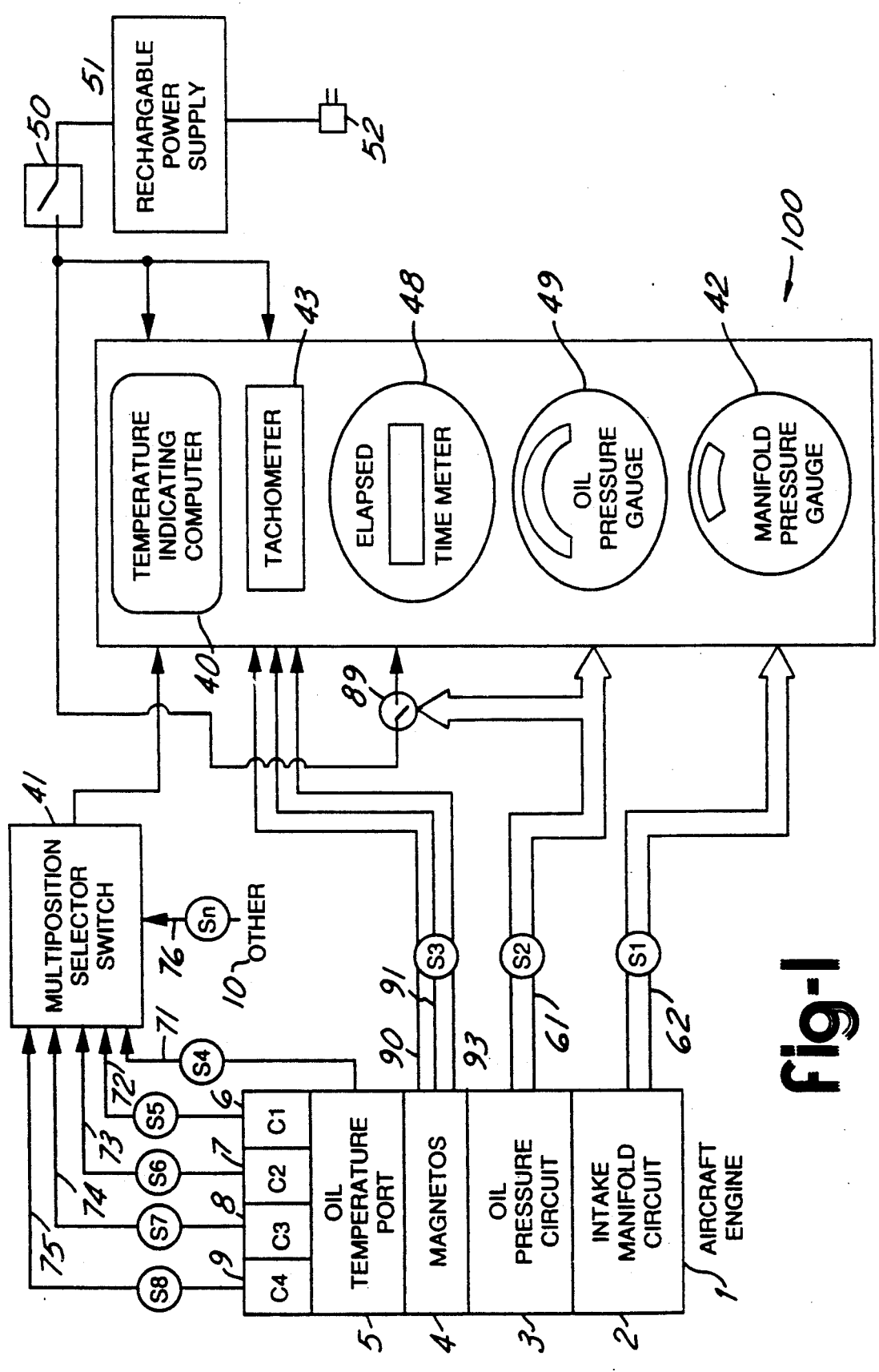
FIG. 1 is a simplified schematic diagram showing a portable testing apparatus of the present invention connected to an aircraft reciprocating engine.

FIG. 1 depicts a portable testing apparatus 100 which is detachably connected to an aircraft reciprocating engine 1 having engine operating parameters to be monitored during testing of the engine before returning it to service. Depending on the positioning of a multiposition selector switch 41, the portable testing apparatus 100 monitors and displays, for example, intake manifold vacuum S1, oil pressure S2, engine operating speed S3, oil temperature S4, cylinder head temperature S5-S8 or a miscellaneous temperature $S_N$. To monitor these parameters, the portable testing apparatus 100 detachably interfaces with an intake manifold circuit 2, an oil pressure circuit 3, a magnetos 4, oil temperature port 5 and cylinder head temperature ports 6-9 of engine 1 by means of a pressure line umbilical cord 60 (FIG. 2) on an electrical wiring umbilical cord 70.

Figure 2:
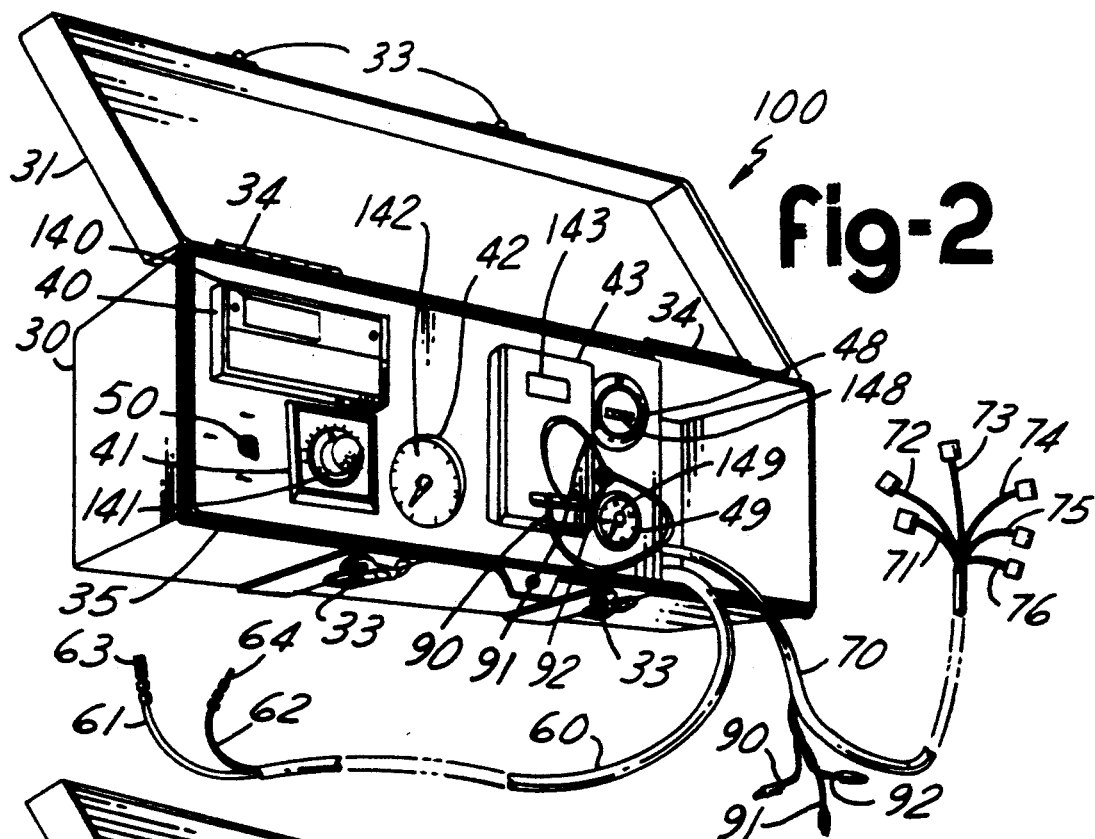
FIG. 2 is a perspective view of the portable testing apparatus from above.
Figure 3:
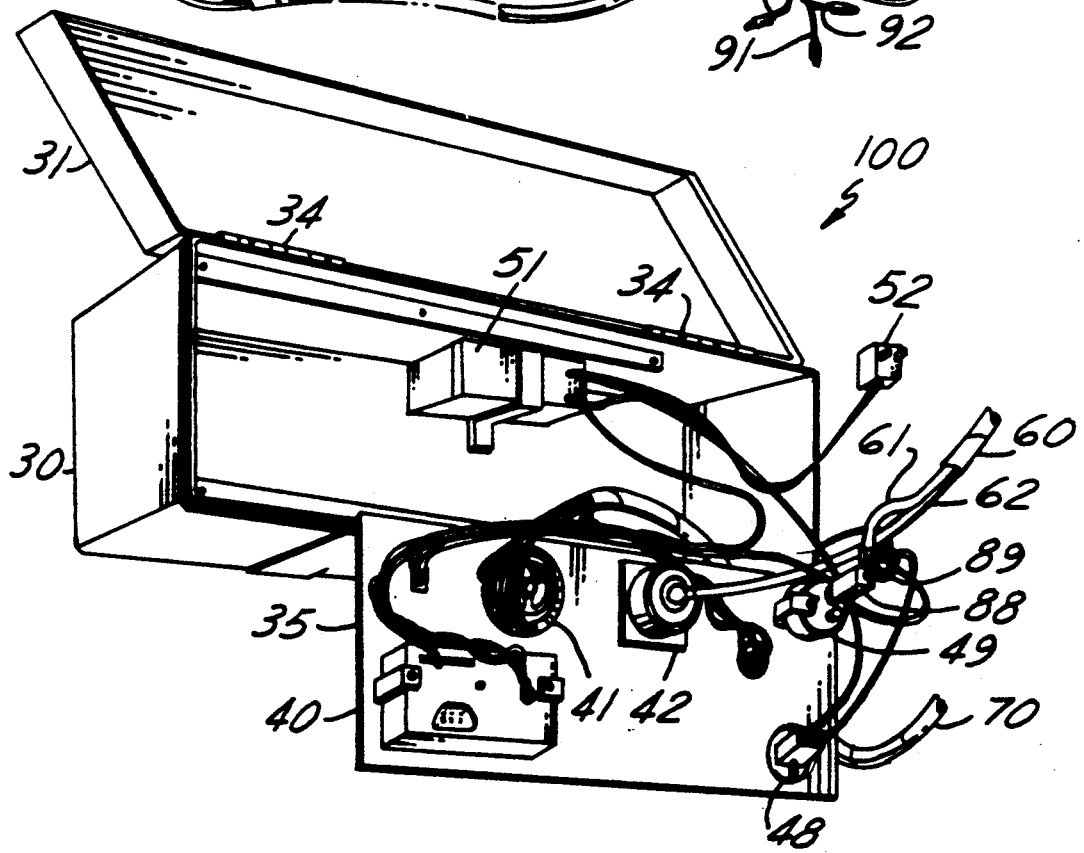
FIG. 3 is a disassembled view thereof.

Referring now to FIGS. 2 and 3, the portable testing apparatus 100 includes a carrying case 30 and a lid 31 interconnected by hinges 34 and laches 33 to securely lock the lid 31 to the case 30. The portable testing apparatus 100 further includes sensing devices, each of which having a display: a temperature indicating computer 40 with display 140, a tachometer 43 with display 143, an intake manifold pressure gauge 42 with display 142, an oil pressure gauge 49 with display 149 and an elapsed time meter 48 with display 148. Displays 140 and 143 indicate oil or cylinder head temperature and engine operating speed in RPM, respectively, by means of a liquid crystal display (LCD). Displays 142 and 149 indicate intake manifold pressure and oil pressure, respectively, by means of an analog dial. In addition, display 148 indicates elapsed engine run time by means of an analog meter.

Moreover, temperature indicating computer 40, intake manifold pressure gauge 42, oil pressure gauge 49, tachometer 43, elapsed time meter 48, multiposition selector switch 41 and on/off switch 50 securely mount to face plate 35 as shown in FIGS. 2 and 3. A rechargeable power supply 51 securely attaches to the inside of case 30 as shown in FIG. 3. Face plate 35 also securely attaches to case 30 as shown in FIG. 2 through screws, clips or other suitable attachment means. With electrical wiring umbilical cord 70 and pressure line umbilical cord 60 separately coiled and placed within carrying case 30, portable testing apparatus 100 becomes readily transportable. Optionally, a handle or other suitable carrying means may be attached to the top side (not shown) of lid 31 in order to enhance portability.

As shown in FIGS. 2 and 3, the portable apparatus 100 includes rechargeable power supply 51 and on/off switch 50. Rechargeable power supply 51 is, for example, a 12 volt 6 amp DC Gell Cell or similar electrical power source which has an adaptor plug 52. Adapter plug 52 detachably connects to any convenient 120 volt alternating current power outlet and transmits electrical energy to rechargeable power supply 51. Either rechargeable power supply 51 or adaptor plug 52 contains an AC/DC converter for converting the alternating current into direct current storable by power supply 51. Through on/off switch 50, rechargeable power supply 51 electrically connects and provides power to temperature indicating computer 40, tachometer 43 and, when oil pressure switch 89 closes, elapsed time meter 48. On/off switch 50 is a toggle or similar type switch capable of handling the power output generated by rechargeable power supply 51.

Figure 5:
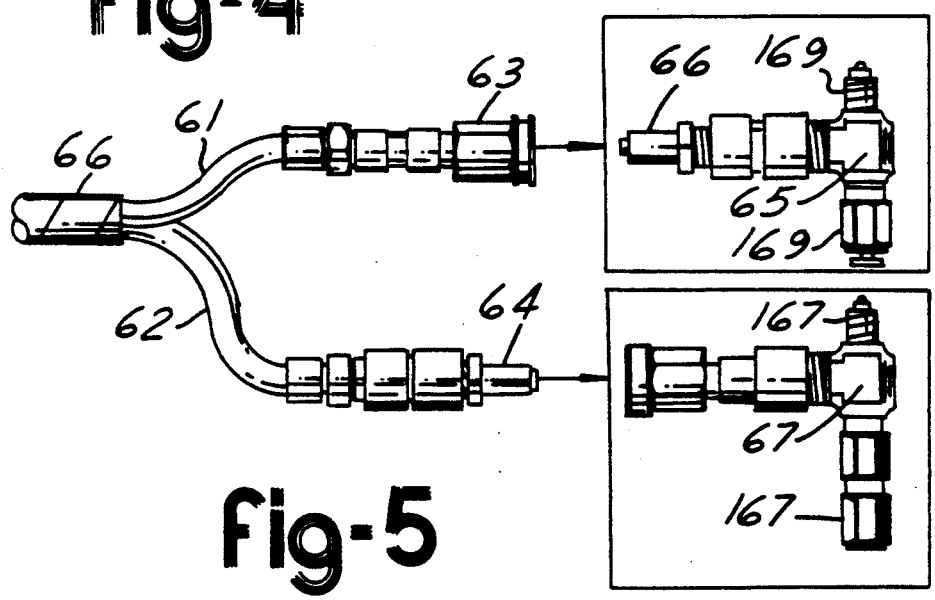
FIG. 5 is a pressure line schematic of the portable testing apparatus showing a pressure line umbilical cord containing oil and intake manifold pressure lines, and illustrating the respective oil and manifold pressure fittings and the corresponding taps which connect within the oil and intake manifold pressure circuits, respectively.

The portable testing apparatus 100 also includes intake manifold pressure gauge 42 for measuring the vacuum level in the intake manifold of aircraft reciprocating engine 1. As shown in FIG. 5, to avoid entanglement of lines, a pressure line umbilical cord 60, in addition to encasing oil pressure line 61, contains intake manifold pressure line 62. To its one end, intake manifold pressure line 62 has a securely attached male connector fitting 64. At its opposite end, intake manifold pressure line 62 fixedly connects to intake manifold pressure gauge 42 as shown in FIG. 3. In order to monitor vacuum level in the intake manifold of engine 1, the two input ports 167 (FIG. 5) of intake manifold pressure tap 67 removably insert within the intake manifold pressure circuit of engine 1 that runs between the intake manifold of engine 1 and the intake manifold pressure gauge of the aircraft. Male connector fitting 64 then detachably connects to female output port 68 of intake manifold pressure tap 67 thereby placing intake manifold pressure gauge 42 into pressure sensing communication with the intake manifold pressure circuit of engine 1. Once the intake manifold pressure circuit of engine 1 has been tapped, intake manifold pressure gauge 42 displays the sensed pressure signal S1 in a numerical representation on display 142.

Continuing with reference to FIGS. 2, 3 and 5, the portable testing apparatus 100 further includes oil pressure gauge 49 for measuring the oil pressure in aircraft reciprocating engine 1. Pressure line umbilical cord 60, in addition to encasing intake manifold pressure line 62, contains oil pressure line 61. To its one end, oil pressure line 61 has a securely attached female connector fitting 63 as shown in FIG. 5. At its opposite end, oil pressure line 61 connects to the input port of a one input/two exit oil pressure splitter 88 as shown in FIG. 3. The first exit port of splitter 88 connects to oil pressure gauge 49 and the second exit port connects to oil pressure switch 89. As indicated in FIG. 5, in order to monitor oil pressure, the two input ports 169 of oil pressure tap 65 removably insert within the oil pressure circuit that runs between an output of the oil pump motor and the oil pressure gauge of the aircraft. Female connector fitting 63 detachably connect to male output port 66 of oil pressure tap 65, thereby placing oil pressure gauge 49 into pressure sensing communication with the oil pressure circuit. Once the oil pressure circuit has been tapped, oil pressure gauge 49 displays the sensed pressure signal S2 in a numerical representation on display 149. It should be noted that intake manifold pressure tap 67 and male connector fitting 64 as well as oil pressure tap 65 and female connector fitting 63 could be color coded or otherwise distinctly marked in order to avoid inadvertent interconnection of the intake manifold and oil pressure lines.

As previously mentioned, oil pressure switch 89 (FIG. 3) also connects to the second exit port of oil pressure splitter 88, thereby placing oil pressure switch 89 into pressure sensing communication with the oil pressure circuit. A Hobbs-brand pressure switch, part number M4009, or other similar commercially available pressure switch may be used to sense oil pressure. As illustrated in FIGS. 1 and 3, oil pressure switch 89 electrically connects to an elapsed time meter 48. When engine 1 is turned on and causes oil pressure to develop within oil pressure line 61, oil pressure switch 89 closes and supplies power to elapsed time meter 48. Elapsed time meter 48 then monitors engine run time and indicates cumulative engine run time on display 148. When the engine is turned off and oil pressure drops, oil pressure switch 89 opens and power is no longer supplied to elapsed time meter 48. It should be noted that elapsed time meter 48 does not automatically reset upon engine turn off. However, it may be reset optionally by means of a manually operated reset button. Accordingly, elapsed time meter 48 is capable of cumulating engine run time over successive stops and starts of the engine.

Figure 4:
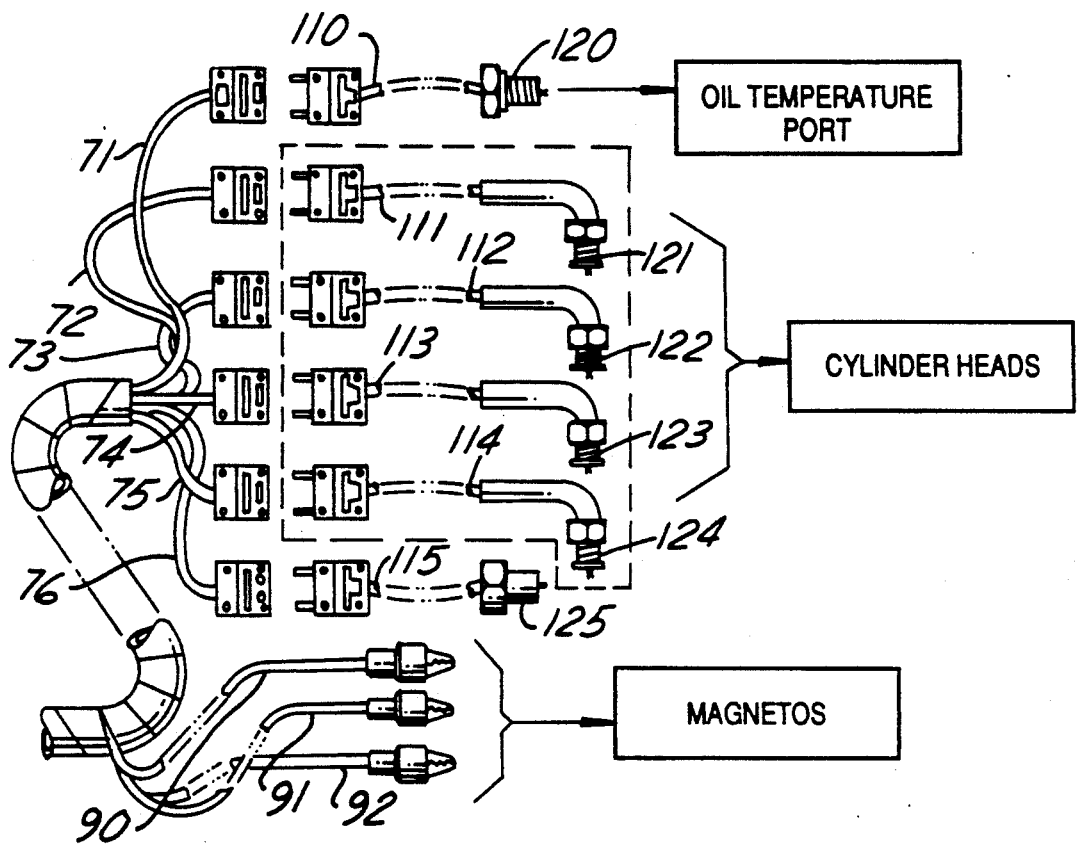
FIG. 4 is an electrical wiring diagram of the portable testing apparatus showing an electrical umbilical cord containing signal and tachometer wires, and illustrating sensor leads together with the respective locations on the aircraft engine to which the sensors and tachometer clips detachably connect.

Referring now to FIG. 4, portable testing apparatus 100 also includes oil sensor lead 110, cylinder head sensor leads 111–114, and miscellaneous sensor lead 115. Oil sensor lead 110 has electrically connected to one end oil sensor 120 and to the other end, a male connector. Oil sensor 120 then detachably inserts into the aircraft manufacturer's designated oil temperature port 5 of the engine in order to sense oil temperature signal S4, as illustrated in FIG. 1. Likewise, each of cylinder head sensor leads 111–114 has electrically connected to one end a cylinder head sensor 121–124, respectively, and to the other end, a male connector. Each of the cylinder head sensors 121–124 detachably attaches to one of the aircraft manufacturer's designated cylinder head temperature ports 6–9, in order to sense cylinder head signals S5–S8, respectively. A miscellaneous sensor lead 115 has electrically connected to one end miscellaneous sensor 125 and to the other end a male connector. Miscellaneous sensor 125 then may be utilized to sense the temperature of either ambient air or another engine-related parameter in order to generate a miscellaneous temperature signal SN. It should be noted that there are illustrated four cylinder head temperature ports 6–9. This number of ports is used for purposes of illustration, not limitation, since the portable testing apparatus 100 may optionally accommodate aircraft reciprocating engines having more than the four cylinder head temperature ports 6–9.

Turning now to FIG. 4, each of the signal wires 71–76 has electrically connected to one end a female connector. These female connectors, in turn, detachably connect to the male connectors corresponding to the sensor leads 110–115. As illustrated in FIGS. 2 and 4, the signal wires 71–76 are encased within electrical wiring umbilical cord 70. Emerging at the other end of electrical wiring umbilical cord 70, each of the signal wires 71–76 electrically connects to a designated position on multiposition selector switch 41 (FIG. 3), thereby placing each position of multiposition selector switch 41 in electrical contact with one of the sensors 120–125. By rotating selector knob 141 of selector switch 41, selector switch 41 selects one of the analog temperature signals S4 through SN and transmits the selected analog temperature signal to temperature indicating computer 40. The computer 40 converts the selected analog temperature signal into a digital temperature signal and indicates the digital temperature signal in corresponding numerical representation on computer display 140. It should be noted that the male connectors of sensor leads 110–115 and the female connectors of signals wires 71–76 could be color coded or otherwise distinctly marked in order to assure that the analog signal selected by selector knob 141 actually corresponds to the temperature of the engine or other parameter intended to be sensed.

In another embodiment of the present invention, the signal wires 71–76 could be modified so as to eliminate the need for the sensor leads 110–115. In this embodiment, the female connectors electrically connected to the signal wires 71–76 would be discarded in favor of directly electrically connecting oil sensor 120, cylinder head sensors 120–124 and miscellaneous sensor 125 to the signal wires 71–76, respectively. Of course, in this embodiment, the length of the signal wires might have to be increased in order to assure that the sensors 120–125 will reach their respective points of attachment on the engine.

The portable testing apparatus also includes tachometer 43 for measuring the operating speed of aircraft reciprocating engine 1. As illustrated in FIG. 4, two positive tachometer wires 90 and 91 and one ground tachometer wire 92 are encased within and protrude from an end of electrical wiring umbilical cord 70. Positive tachometer wires 90 and 91 have fastened at their ends alligator-type clips 190 and 191, respectively, and ground tachometer wire 92 has fastened to its end alligator-type clip 192. Positive alligator clip 190 detachably clamps to the left magneto of the engine. Positive alligator clip 191 detachably clamps to the right magneto of the engine. Ground alligator clip 192 detachably clamps to any convenient engine ground. At the other end of electrical wiring umbilical cord 70, tachometer wires 90, 91 and 92 connect to the left magneto, right magneto and ground terminals of tachometer 43, respectively. Since most aircraft reciprocating engines are four-cycle engines, the left and right magnetos each distribute high voltage ignition pulses to the spark plugs once for every two revolutions. Thus, in operation, tachometer 43 measures the operating speed of the engine by sensing these electrical pulse signals S3 and indicates a corresponding numerical representation on its display 143.

In a preferred embodiment, tachometer 43 includes a self-contained, battery power supply and a memory. Tachometer 43 may be powered by a 9 volt DC battery or similar power supply and thereby have a source of electrical energy independent of the rechargeable power supply 51. Further, tachometer 43 may be employed to calculate and store in its memory the average operating speed of the engine and the maximum operating speed achieved during an engine run-in test. Additionally, tachometer 43 may be removably attached to portable testing apparatus 100, thereby permitting use of the tachometer away from and independent of portable testing apparatus 100.

While the best mode for carrying out the invention has been described in detail, those familiar with the art to which this invention relates will recognize various alternative designs and embodiments for practicing the invention as defined by the following claims.

What is claimed is:

1. A portable testing apparatus for monitoring the operating parameters of an aircraft reciprocating engine having cylinders, an intake manifold circuit, magnetos, and oil flowing through an oil pressure circuit and through an oil temperature port, the portable testing apparatus comprising:
   a plurality of sensors detachably attached to the cylinders and to the oil temperature port to facilitate deployment of the testing apparatus and for sensing the temperature thereof and for generating analog temperature signals corresponding to the sensed temperature;
   a multiposition selector switch connected to each of said sensors, said selector switch being adapted for receiving and selecting one of said analog temperature signals so that indicia of said signals may be displayed singularly for ready analysis by an operator;
   a temperature indicating computer connected to said multiposition selector switch, said temperature indicating computer being adapted for converting said analog temperature signals into digital signals and for displaying said digital signals;
   a tachometer connected to the magnetos, said tachometer being adapted for measuring an operating speed of the engine;
   a manifold pressure gauge in communication with the intake manifold circuit, said manifold pressure gauge being adapted for measuring intake manifold pressure;
   an oil pressure gauge in communication with the oil pressure circuit, said oil pressure gauge being adapted for measuring oil pressure;
   an oil pressure switch in communication with the oil pressure circuit, said oil pressure switch being adapted to close when the engine develops oil pressure; and
   a rechargeable power supply means for providing the portable testing apparatus with a self-contained source of electrical energy so that said portable testing apparatus may monitor operating parameters of the engine.

2. The portable testing apparatus of claim 1 further comprising a pressure line connecting means for connecting said manifold pressure gauge and said oil pressure gauge to the intake manifold and oil pressure circuits, respectively.

3. The portable testing apparatus of claim 2 wherein said pressure line connecting means further comprises:
   an intake manifold pressure tap having one output port and two input ports, said two input ports being disposed within the intake manifold circuit;
   an intake manifold pressure line provided between said intake manifold pressure gauge and said output port;
   an oil pressure tap having one output port and two input ports, the two input ports being disposed within the oil pressure circuit;
   an oil pressure splitter having one input and two exit ports, one exit port being connected to said oil pressure switch and one exit port being connected to said oil pressure gauge;
   an oil pressure line provided between said input port of said oil pressure splitter and said output port of said oil pressure tap; and
   a pressure line umbilical cord being adapted for encasing said intake manifold pressure line and said oil pressure line extending from said portable testing apparatus to the engine thereby protecting said lines from abrasion, puncture and other destructive forces,
   whereby said intake manifold pressure gauge and said oil pressure gauge are placed in pressure sensing contact with the intake manifold circuit and the oil pressure circuit.

4. The portable testing apparatus of claim 1 further comprising electrical wiring connecting means for electrically connecting said sensors to said selector switch and for electrically linking said magnetos to said tachometer.

5. The portable testing apparatus of claim 4 wherein said electrical wiring connecting means further comprises:
   a plurality of sensor leads, said sensor leads each having a first end with a male connector and a second end connected to one of said sensors;
   a plurality of signal wires, said signal wires each having a first end with a female connector and a second end connected to said multiposition selector switch, each female connector detachably connecting to one of said male connectors thereby placing multiposition selector switch into electrical contact with said sensors;
   three tachometer wires, said tachometer wires each having two ends, the first wire at one end thereof having a clip and at the other end connecting to a left magneto terminal of said tachometer, the second wire at one end thereof having a clip and at the other end connecting to a right magneto terminal of said tachometer, the third wire at one end thereof having a clip and at the other end connecting to a ground terminal of said tachometer, the clips of the first and second wires being adapted for detachably attaching respectively to left and right magnetos and the clip of the third wire being adapted for detachably attaching to a grounding point of the engine, thereby permitting said tachometer to measure the operating speed of the engine; and an electrical wiring umbilical cord encasing said signal wires and said tachometer wires extending from said portable testing apparatus to the engine, thereby protecting said signal wires and said tachometer wires from entanglement, abrasion and other destructive forces.

6. The portable testing apparatus of claim 1 further comprising means for monitoring total run time of the engine, said monitoring means being electrically connected to said oil pressure switch so that when said oil pressure switch closes, said monitoring means records engine run time until said oil pressure switch opens.

7. The portable testing apparatus of claim 6 wherein the said means for monitoring total engine run time further comprises an elapsed time meter having a digital display.

8. The portable testing apparatus of claim 1 further comprising an on/off switch for connecting and disconnecting said rechargeable power supply means to and from said portable testing apparatus.

9. The portable testing apparatus of claim 1 wherein said tachometer further includes a battery power supply and removably attaches to said portable testing apparatus, said battery power supply providing said tachometer with a self-contained source of electrical energy so that said tachometer may be used away from and independent of said portable testing apparatus.

10. The portable testing apparatus of claim 1 wherein said rechargeable power supply means further comprises:
a rechargeable power supply for storing electrical energy; and
an adaptor plug having a converter for converting alternating current into direct current storable by said rechargeable power supply.

11. The portable testing apparatus of claim 1 wherein said rechargeable power supply means further comprises:
a rechargeable power supply for storing electrical energy, said rechargeable power supply having a converter for converting alternating current into direct current; and
an adaptor plug for transmitting alternating current to said converter.

12. The portable testing apparatus of claim 1 further comprising electrical wiring encased in a first cable for connecting to said plurality of sensors, and pressure lines encased in a second cable for connecting to said manifold pressure gauge and said oil pressure gauge.

13. A portable testing apparatus for monitoring the operating parameters of an aircraft reciprocating engine having cylinders, an intake manifold pressure circuit, magnetos, and oil flowing through an oil pressure circuit and through an oil temperature port, the portable testing apparatus comprising:
a plurality of sensors detachably attached to the cylinders and to the oil temperature port for sensing the temperature thereof;
a temperature indicating computer connected to said plurality of sensors;
a tachometer connected to the magnetos for measuring an operating speed of the engine; and
pressure sensing means in communication with the intake manifold and oil pressure circuits, the portable testing apparatus enabling operating parameters of the engine to be monitored when the engine is mounted in the aircraft.

14. The portable testing apparatus of claim 13 wherein said pressure sensing means include a manifold pressure gauge in communication with the intake manifold pressure circuit and an oil pressure gauge in communication with the oil pressure circuit.

15. The portable testing apparatus of claim 14 further including a multiposition selector switch connected to said sensors.

16. The portable testing apparatus of claim 15 further including an oil pressure switch in communication with the oil pressure circuit, said oil pressure switch being adapted to close when the engine develops oil pressure.

* * * * *